United States Patent [19]
Pinkerton

[11] Patent Number: 5,572,079
[45] Date of Patent: Nov. 5, 1996

[54] MAGNETIC BEARING UTILIZING BRUSHLESS GENERATOR

[75] Inventor: Joseph F. Pinkerton, Austin, Tex.

[73] Assignee: Magnetic Bearing Technologies, Inc., Austin, Tex.

[21] Appl. No.: 361,142

[22] Filed: Dec. 21, 1994

[51] Int. Cl.⁶ ................................................. H02K 7/09
[52] U.S. Cl. ................................................. 310/90.5
[58] Field of Search ........................... 310/90.5, 68 B, 310/68 R; 324/207; 318/615, 624

[56] References Cited

U.S. PATENT DOCUMENTS

| | | | |
|---|---|---|---|
| 3,988,658 | 10/1976 | Meinke et al. | 318/647 |
| 4,392,693 | 7/1983 | Habermann et al. | 310/90.5 |
| 4,444,444 | 4/1984 | Benedetti et al. | 310/90.5 |
| 4,866,318 | 9/1989 | Habermann et al. | 310/90.5 |
| 4,920,290 | 4/1990 | Murakami et al. | 310/90.5 |
| 4,983,869 | 1/1991 | Vaidya et al. | 310/90.5 |
| 5,051,637 | 9/1991 | Harris et al. | 310/90.5 |
| 5,053,662 | 10/1991 | Richter | 310/90.5 |
| 5,142,175 | 8/1992 | Watanabe | 310/90.5 |
| 5,177,387 | 1/1993 | McMichael et al. | 310/90.5 |
| 5,179,308 | 1/1993 | Malsky | 310/90.5 |
| 5,216,308 | 6/1993 | Meeks | 310/90.5 |
| 5,300,843 | 4/1994 | Lyons et al. | 310/90.5 |
| 5,319,273 | 7/1994 | Hockney et al. | 310/90.5 |

OTHER PUBLICATIONS

E. H. Maslen et al, "Permanent Magnet Biased Active Magnetic Bearings", *Proceedings of MAG '93, Magnetic Bearings, Magnetic Drives and Dry Gas Seals Conference & Exhibition*, pp. 117–128, Jul. 29–30, 1993.

"Wide Range Turbomolecular Pump 180 HM with Magnetic Bearings", *Balzers Sales Brochure*, published by Balzers, Hudson, NH, 1994.

"Brushless Motors & Brushless Motor Operation", *Compumotor Digiplan, 1993-43 Positioning Control Systems and Drives Catalogue*, published by Compumotor Division, Rohnert Park, CA, pp. A17–A18, Jun. 1993.

Primary Examiner—Thomas M. Dougherty
Assistant Examiner—Michael Wallace, Jr.
Attorney, Agent, or Firm—Fish & Neave; Robert W. Morris

[57] ABSTRACT

An active magnetic bearing utilizing a brushless generator which provides electrical energy to the bearing is disclosed. The use of a brushless generator reduces the size, volume, complexity and cost requirements of the total magnetic bearing system. In the preferred embodiments, the brushless generator provides increased output by utilizing air-core coils in place of ferrous coils in regions of the generator which operate at high frequencies. The air-core coils enable the generator to rotate at speeds in excess of 24,000 rpm while continuing to operate efficiently because core losses, due to the use of traditional iron cores (e.g., hysteresis and eddy-currents), are virtually eliminated. Both radial and axial bearings are provided, as well as a method for maintaining magnetic levitation of a rotating member.

26 Claims, 6 Drawing Sheets

MAGNETIC BEARING UTILIZING BRUSHLESS GENERATOR

BACKGROUND OF THE INVENTION

This invention relates to magnetic bearings and methods for providing electrical energy to the magnetic bearings. More particularly, this invention relates to active magnetic bearings in which the control currents to the bearings are supplied by one or more generators, such as brushless generators. It may also be preferable to utilize brushless generators having air-core coils in place of iron-core windings in regions of the generators that are exposed to high frequency magnetic fields to provide even greater amplification of the supply energy to the magnetic bearings.

The use of magnetic bearings is well known. Magnetic bearings rely on attractive forces generated within a gapped magnetic circuit to generate forces on a supported rotating object (e.g., an iron shaft or disk). In traditional magnetic bearings, several energized ("biased") electromagnets are placed around the rotating object. All of the electromagnets are typically energized because the control coils of the magnetic bearings are inherently inductive, which directly affects the rate at which changes can occur in the electromagnetic forces. As the object moves out of a predetermined alignment position, the energy supplied to one or more selected electromagnets is increased, causing the rotating object to be pulled back into alignment.

The biasing of the electromagnets may be performed in several different ways. For instance, many magnetic bearings include biasing circuits which constantly apply bias current to the coils, thereby energizing the magnetic circuits to create a relatively small constant bias field in the bearing (for example, the constant field may be set at about 0.5 Tesla). It is also known to instead bias the electromagnets using permanent magnets to create the constant bias field, in which case the coils are only used by the control circuits.

One disadvantage of known active magnetic bearings is related to the delivery of control energy to the bearings. In some typical active magnetic bearings, as much as 100,000 watts of peak power must be supplied to the electromagnets in order to maintain the proper position of the rotating object (for example, large turboexpanders, large compressors, jet engines, etc.). To efficiently provide such a large amount of energy, the supply circuits are traditionally based on AC power, including massive electronic amplifiers. Additionally, the electromagnetic circuits require DC power, and thus, large, high-power, electronic switches are also required. The amplifiers and switches add substantial mass and volume to the active bearings systems, as well as substantial cost. For example, a typical DC power supply, electronic amplifier array and uninterruptible power supply (UPS) (in case of power failure) may cost upwards of one dollar per watt. Therefore, a 100,000 watt magnetic bearing would require a $100,000 power supply system.

One proposed solution to the cost, size and complexity of permanent magnet and electromagnet systems is the use of superconductive materials. For example, McMichael et al. U.S. Pat. No. 5,177,387 describes magnetic bearings in which high temperature superconducting material is utilized to provide support to a rotating member. However, these magnetic bearings still require the use of liquid nitrogen to cool the superconducting material such that it will perform adequately. As such, superconducting magnetic bearings may also be complex and costly systems to provide.

In view of the foregoing, it is an object of the present invention to provide improved active magnetic bearings in which energy is supplied to the bearing in an improved manner.

It is also an object of the present invention to provide improved active magnetic bearings in which the size of the power supply for the bearing is reduced.

It is a further object of the present invention to provide improved active magnetic bearings which may be produced at a reduced cost when compared to present magnetic bearings.

SUMMARY OF THE INVENTION

These and other objects of the invention are accomplished in accordance with the principles of the invention by providing active magnetic bearings utilizing brushless generators to supply energy to the electromagnets. Brushless generators may be utilized in active magnetic bearings to generate the high levels of power which may be needed to maintain the rotating member in its proper alignment by overcoming the inductive reactance of the bearing's inductive load, thereby increasing the bearing's bandwidth (i.e., the time rate of change of force). In typical brushless generators, an exciter winding is fed a small input signal which induces a much larger signal in a rotating member. The larger signal is input to a main stage where an even larger signal is induced. The output signal of the main stage may be effectively 10,000 times greater than the input signal. Thus, 100,000 watts of power could be provided to the electromagnets based on a 10 watt input signal. Brushless generators may be produced at reduced size, complexity and cost when compared to the traditional electronic amplifiers, DC power supplies and UPS systems of previously known active magnetic bearings.

The preferred embodiments of the present invention include brushless generators that are able to operate at high frequencies without experiencing losses traditionally associated with such devices. These brushless generators utilize an "air-core" coil in place of the traditional ferrous core in regions of the device that operate at high frequencies. The air-core coil is a non-magnetic coil of wire which, when exposed to magnetic fields, may have a voltage or current induced therein (i.e., no ferrous material is used). By removing iron from the high frequency fields in the device, the effects of core losses are virtually eliminated, thus allowing the device to efficiently operate at significantly higher rotational speeds.

The active magnetic bearings of the present invention provide a constant bias field in the air-gaps of the electromagnets. Position sensors measure the distance between the rotating member and a stationary member to determine whether misalignment is occurring. If action is required to re-establish alignment, the brushless generators are used to supply power to selected electromagnets through rectifier circuits, depending on which direction the position offset is occurring.

Embodiments of the present invention are described including two versions of an axial magnetic bearing, as well as a radial magnetic bearing. To provide magnetic levitation to a rotating object, a combination of two radial bearings and one axial bearing is employed. The radial bearings should be placed sufficiently apart from each other so that they can resist twisting forces.

In the axial embodiments, the position of a rotating disk is maintained, while the radial embodiments provide alignment for a rotating shaft. One axial embodiment employs a single two-stage brushless generator and two high-power SCRs to provide energy to the electromagnets. An alternate preferred embodiment of the axial bearing utilizes two two-stage brushless generators and simpler full-wave bridge rectifiers (in place of the more complicated high-power SCR units).

Further features of the invention, its nature and various advantages will be more apparent from the accompanying drawings and the following detailed description of the preferred embodiments.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
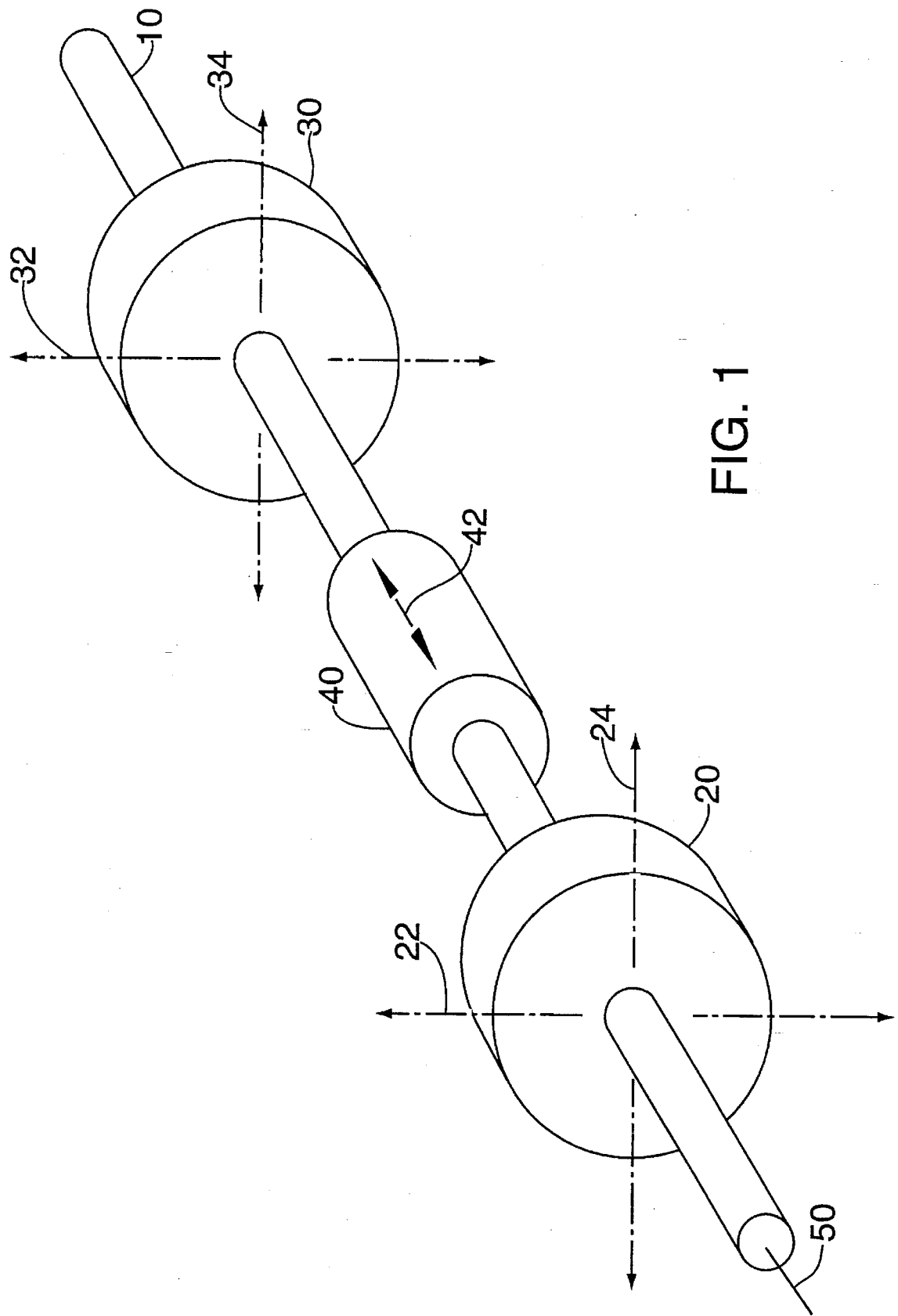
FIG. 1 is a perspective view of a rotating shaft and three active magnetic bearings in accordance with the principles of the present invention.

Referring to FIG. 1, a shaft 10 is magnetically levitated by radial active magnetic bearings 20 and 30 and axial active magnetic bearing 40 in accordance with the principles of the present invention. Magnetic bearing 20 provides alignment of shaft 10 with respect to axes 22 and 24. Magnetic bearing 30 provides alignment of shaft 10 with respect to axes 32 and 34, and magnetic bearing 40 does the same with respect to axis 42. Provided that bearings 20 and 30 are spaced sufficiently apart to resist twisting forces, bearings 20, 30 and 40 provide shaft 10 with full 5-axis magnetic levitation on axis 50. As described below, when shaft 10 becomes displaced in any of the five axes, control signals are applied to selected electromagnets to re-align the shaft.

Figure 2:
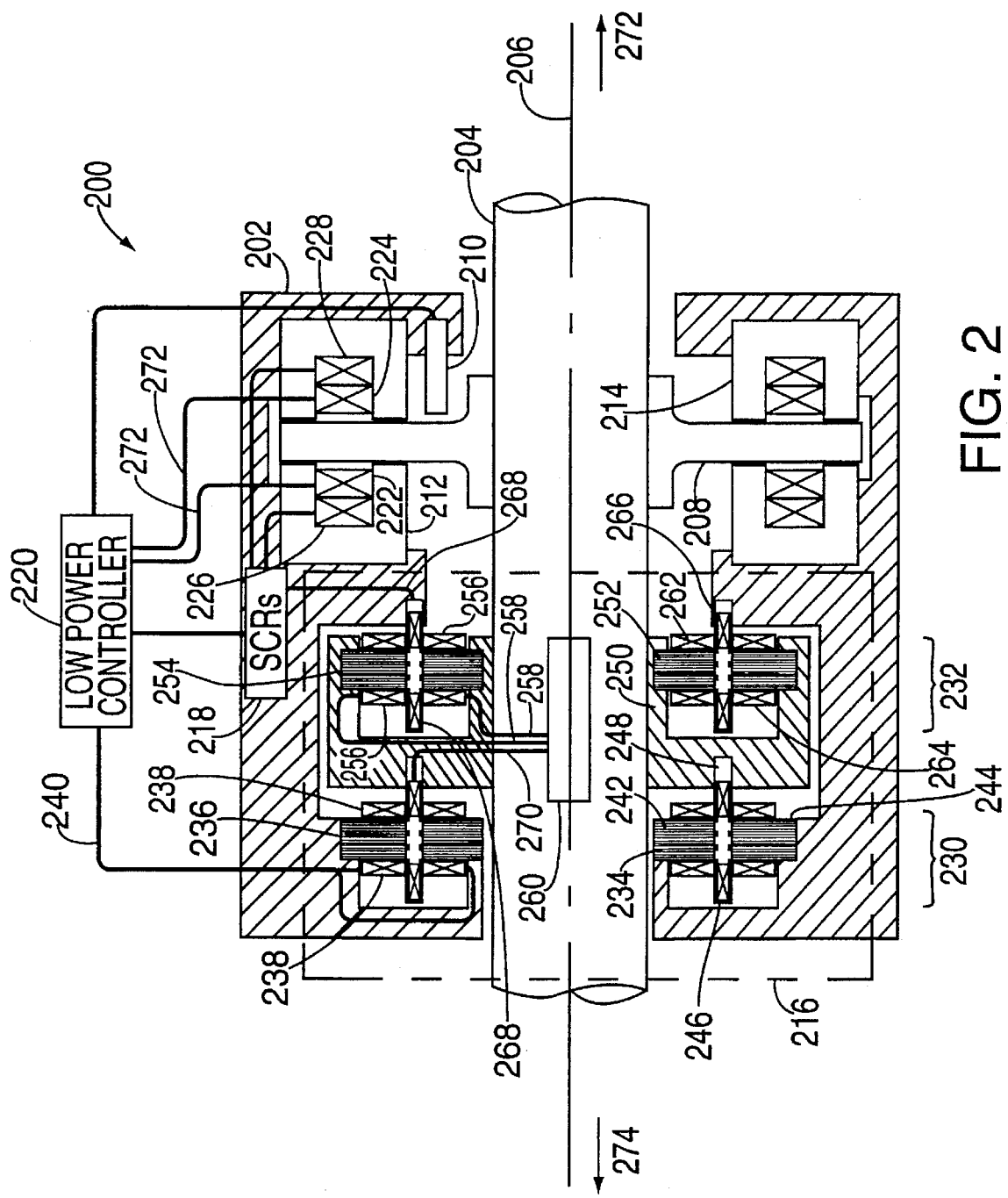
FIG. 2 is a longitudinal cross-sectional view of a preferred embodiment of an axial active magnetic bearing, in accordance with the principles of the present invention.

FIG. 2 shows a first preferred embodiment of an axial active magnetic bearing 200. Bearing 200 includes stationary housing 202 (which may be formed as a single piece of high-strength fiber-epoxy, or it may be formed using multiple pieces of a non-magnetic material such as aluminum), rotating shaft 204 (which rotates about axis 206), rotating disk 208, position sensor 210, electromagnets 212 and 214, brushless generator 216, silicon controlled rectifiers (SCRs) 218 and low power controller 220. Electromagnets 212 and 214 also include bias windings 222 and 224, respectively and control windings 226 and 228, respectively.

Brushless generator 216 includes several rotating and stationary components. For ease of discussion, generator 216 is considered to be formed of two separate stages, exciter stage 230 and main stage 232. The input signal is fed into exciter stage 230 from controller 220, while the output signal is output from main stage 232 into SCRs 218. Low power controller 220 is preferably a conventional PID (Proportional/Integral/Derivative) circuit which monitors the present disk position (proportional), past disk position (integral) and velocity (derivative) to determine the magnitude of the signals to send to brushless generator 216.

Exciter stage 230 includes a plurality of stationary electromagnets 234 (for example, generator 216 has eight pairs of electromagnets 234) located at equidistant points about the circumference of shaft 204. Electromagnets 234 may comprise ferrous core 236 surrounded by windings 238. Windings 238 are coupled to input line 240 which receives the input signals from controller 220, as is described more fully below.

Core 236 may be formed from a laminated stack of magnetic material such as soft iron or steel (such that the material is only magnetized in the presence of a magnetic field). Alternatively, core 236 may be formed from a solid magnetic material such as ferrite, or any other suitable material. Electromagnets 234 are arranged in pairs which may be referred to as inner electromagnets 242 and outer electromagnets 244 for convenience.

Exciter stage 230 also includes a plurality of electrically conductive, non-magnetic, air-core loops 246 embedded within a tube 248, which forms the armature of the exciter. Although it is preferable that the armature of the exciter be formed with air-core loops, the magnetic bearing of the present invention will also be effective with traditional iron-core components in the exciter armature. Tube 248 is fixedly mounted to shaft 204 (via mounting 250) such that when shaft 204 rotates, the plurality of air-core loops 246 are rotated about axis 206 (which is parallel to the longtitudal axis of bearing 200) between inner electromagnets 242 and outer electromagnets 244. The rotational axis of shaft 204 may be connected to a motor or prime mover (not shown).

Main stage 232 includes a plurality of electromagnets 252 which are radially mounted to, and at equidistant points about, shaft 204. It is preferable, but not essential, that there be the same number of electromagnets 252 in main stage 232 as there are electromagnets 234 in exciter stage 230. Electromagnets 252 are substantially similar to electromagnets 234 and thus, may also be comprised of a ferrous core 254 surrounded by windings 256. Unlike windings 238, windings 256 are coupled to conversion lines 258 which receive the input signals from conversion circuitry 260. Conversion circuitry 260 converts AC signals to DC signals, as described below, and may include any conventional rectification circuit (for example, a full-wave bridge rectifier). Alternatively, conversion circuitry 260 may also include a parallel capacitor (not shown) to condition the pulsating DC signal into a smoother DC signal.

Core 254 may also be formed from a laminated stack of magnetic material such as soft iron or steel (such that the material is only magnetized in the presence of a magnetic field). Alternatively, core 254 may be formed from a solid magnetic material such as ferrite, or any other suitable material. Electromagnets 252 are arranged in pairs which, for reference purposes, may be referred to as inner electromagnets 262 and outer electromagnets 264.

Main stage 232 also includes a plurality of electrically conductive air-core loops 266 embedded within a tube 268 which is fixedly mounted to housing 202. In main stage 232, when shaft 204 rotates, the plurality of electromagnets 252 are rotated about axis 206 such that air-core loops 266 are located between inner electromagnets 262 and outer electromagnets 264. Conductive air-core loops 266 are coupled to output line 268, which provides the output signal from generator 216 to SCRs 218.

As previously described, the use of air-core coils provides virtual elimination of the effects of core losses. An additional advantage of using a brushless generator with air-core coils is the lack of magnetic attraction forces between the armature and the electromagnets of the brushless generator. However, a further advantage of the air-core coils of the present invention results in the substantially reduced size, and therefore mass, of the armature coils with respect to the overall size of the generator. For example, the ratio of the thickness of air-core coil 266 (i.e., radial length) to the diameter of generator 216 is approximately 40. For effective operations, the diameter of the brushless generator should be at least approximately twenty times greater than radial length of the air-core coils. (The reference point of the air-core coil is rotated by 90° for the brushless generator shown in FIG. 6, so that the radial length of the generator is compared to the axial length of the air-core coils.)

Each pole of electromagnet 252 has a corresponding air-core loop 266 which spans the longitudinal length of electromagnet 252. The air-core loops 266 are embedded in tube 268 with only a small circumferential gap between each air-core loop 266 such that the plurality of air-core loops 266 essentially comprises a cylinder. The motor or prime mover (not shown) rotates shaft 204, and therefore air-core loops 266, along a rotational axis 206.

Each air-core loop (including loops 246, 266, 506 and 904, as shown in the figures) may be a unitary piece of solid electrically conductive material, but preferably air-core loop is made up of turns of wire consisting of a plurality of electrical conductors which are electrically insulated from each other and are electrically connected together in parallel. One such wire, known as litz wire, is constructed of individual film-insulated wires which are bunched or braided together in a uniform pattern of twists and length of lay. This configuration reduces skin effect power losses of solid conductors, or the tendency of radio frequency current to be concentrated at the conductor surface. Properly constructed litz wires have individual strands each positioned in a uniform pattern moving from the center to the outside and back within a given length of the wire.

The manner in which conductive air-core loops 246 affect brushless generator 216 is now described (this description is equally applicable to air-core loop 266 in main stage 232, as well as the other air-core loops described herein). Essentially, when current is applied to windings 238, magnetic fields are generated between inner electromagnets 242 and outer electromagnets 244. As air-core loops 246 rotate (on axis 206) through the fields, the relative motion between air-core loops 246 and electromagnets 242 produces an electromotive force (i.e., a voltage around each of the conductive loops) which induces current in air-core loops 246. Thus, a voltage is induced in exciter stage 230 without the use of iron in the armature (which is the high frequency portion of the exciter).

It should be apparent to persons skilled in the art that a simple removal of ferrous material from the armature core of a conventional brushless generator would not produce a generator which could operate as effectively. Further modifications of the armature must also be made as described herein for proper operation. For example, the diameter of the brushless generator should be at least approximately twenty times greater than the radial length of the air-core coils (as described above) and the axial length of the ferrous core of the electromagnet should be at least approximately three times greater than the radial length of the air-coil core (as describe below).

The operation of brushless generator 216 will now be described. Brushless generator 216 operates by providing a small DC input signal or a low frequency AC input signal, such as one watt, from low power controller 220 to input line 240 while shaft 204 is rotating about axis 206. The input signal is fed to windings 238 which energize stationary electromagnets 234, thereby creating small, radially-directed, DC magnetic fields. At the same time, shaft 204 rotates air-core loops 246 through the generated DC fields and thus, as described above, AC currents are induced in the air-core loops 246.

The induced AC currents are fed, through exciter output lines 270, to conversion circuitry 260. The conversion circuitry converts the AC signal to a DC signal such that the input power is amplified by the exciter stage by a factor of approximately 100. It should be noted that the amplification factor increases rapidly with respect to rpm. For effective amplification, the axial length of core 254 of electromagnet 252 should be at least approximately three times greater than the radial length of air-coil core 266. The greater the ratio, the greater the amplification. (The reference points are rotated by 90° for the brushless generator shown in FIG. 6, so that the radial length of the electromagnet is compared to the axial air gap.)

Similarly, the amplified DC signal is fed to the windings 256 of rotating electromagnets 252. The amplified DC signal energizes electromagnets 252, thereby creating a second set of radially-directed DC fields which, in this case, are rotating about axis 206. Because air-core loops 266 are located in the rotating fields, in a manner similar to the interaction between electromagnets 234 and air-core loops 246, AC voltages are induced in air-core loops 266. Because the magnetic bearing electromagnets are only activated by current, these voltages must ultimately result in some current for the magnetic bearing electromagnets to produce a force. These induced voltages are provided as outputs from generator 216 at output lines 268 to SCRs 218. Due to the dual amplification (each stage amplified the power of the signal input to it by a factor of 100), the power of the final output signal is approximately 10,000 times greater than the small signal which was input to exciter 230.

The operation of axial magnetic bearing 200 will now be described with respect to FIGS. 2 and 3. Controller 220 constantly applies a DC current to bias windings 222 and 224 through lines 272 to maintain a constant bias field in the air-gaps of electromagnets 212 and 214. It should be noted that the constant fields may just as easily be produced by properly placing permanent magnets (not shown) about electromagnets 212 and 214 without departing from the spirit of the invention.

Figure 3:
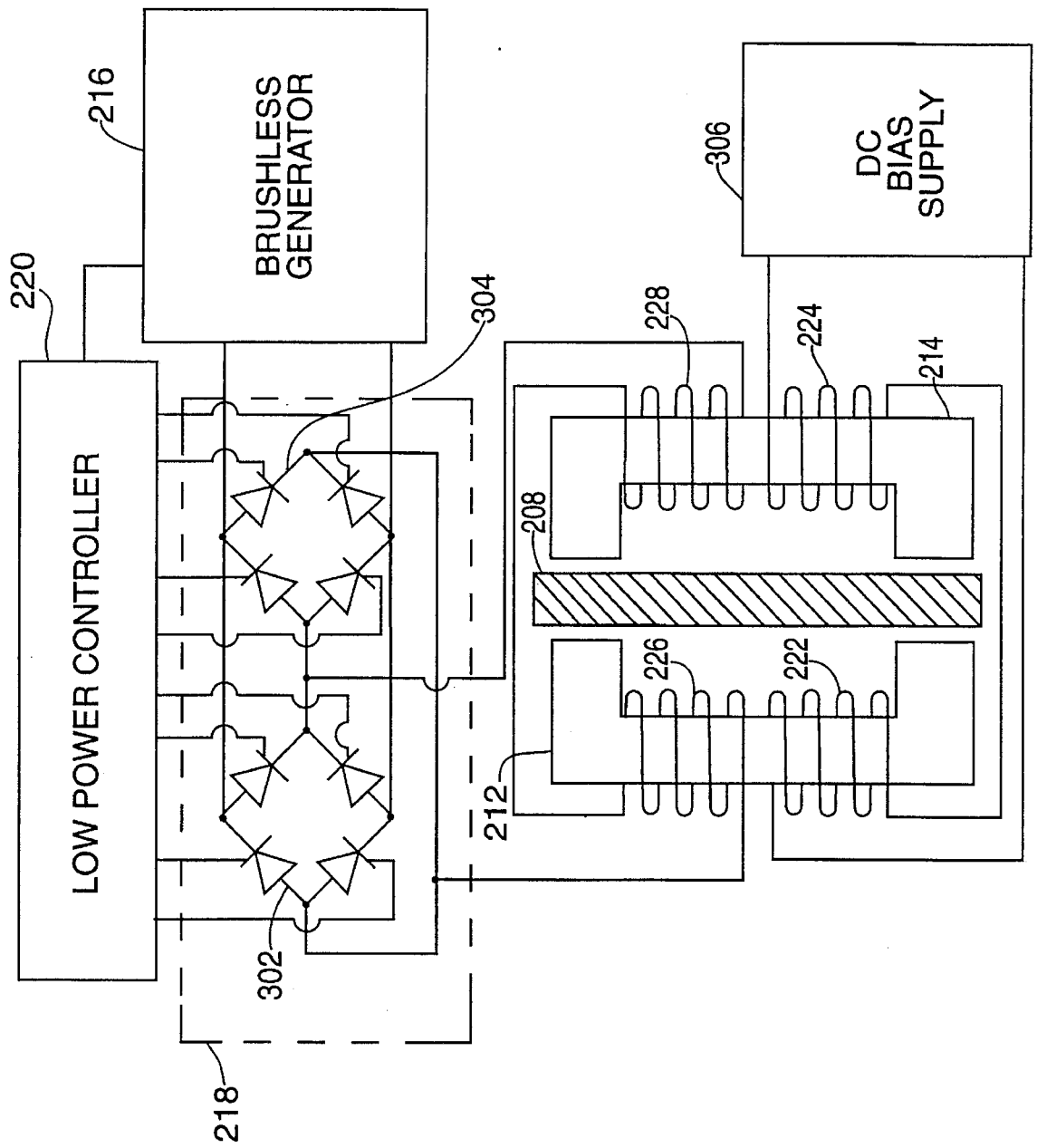
FIG. 3 is a schematic block diagram of an exemplary view of the axial magnetic bearing of FIG. 1.

As shown in FIG. 3, SCRs 218, including SCR 302 and SCR 304, are wired such that when SCR 302 is turned on, it supplies current to the electromagnets 212 and 214 of a first polarity and when SCR 304 is turned on, it supplies current to the electromagnets 212 and 214 of the opposite polarity. Electromagnets 212 and 214 are wired, with respect to the bias currents supplied by DC bias supply 306 (shown independent of controller 220 in FIG. 3) such that the output from each SCR acts to strengthen the field of one electromagnet and weaken the field of the other.

Position sensor 210 (shown in FIG. 2) measures the axial distance between disk 208 and housing 202. If disk 208 is axially centered, controller 220 takes no action. However, if sensor 210 determines that disk 208 is displaced in either axial direction, controller 220 sends a signal through input line 240 to brushless generator 216. As described above, this signal is amplified by a factor of about 10,000 and is directed to SCRs 218 through lines 268.

If shaft 204 moves in one axial direction, one of SCRs 302 and 304 is turned on by controller 220 causing the amplified current to flow from brushless generator 216 to electromagnets 212 and 214. In the presence of the bias currents, the generator current causes an increase in electromagnetic force of the electromagnet opposite the offset (i.e., an offset in direction 272 generates a current causing an increase in force in electromagnet 212 and a corresponding decrease in force in electromagnet 214, while an offset in direction 274 has the opposite effect) which pulls disk 208 back toward its center position.

Persons skilled in the art will appreciate that, due to the advantages of the present invention, it is not necessary to generate constant bias fields for the bearings. The use of a brushless generator as a power source for the magnetic bearing provides a source of readily available, rapidly-responsive and inexpensive power to the bearing (instead of having to use expensive permanent magnets or constantly burning power). If constant bias fields are not utilized, only one of each pair of opposing electromagnets would be operational at the same time. In such an embodiment, the controller would simply route current from the brushless generator to the proper electromagnet based on the direction of displacement.

Figure 4:
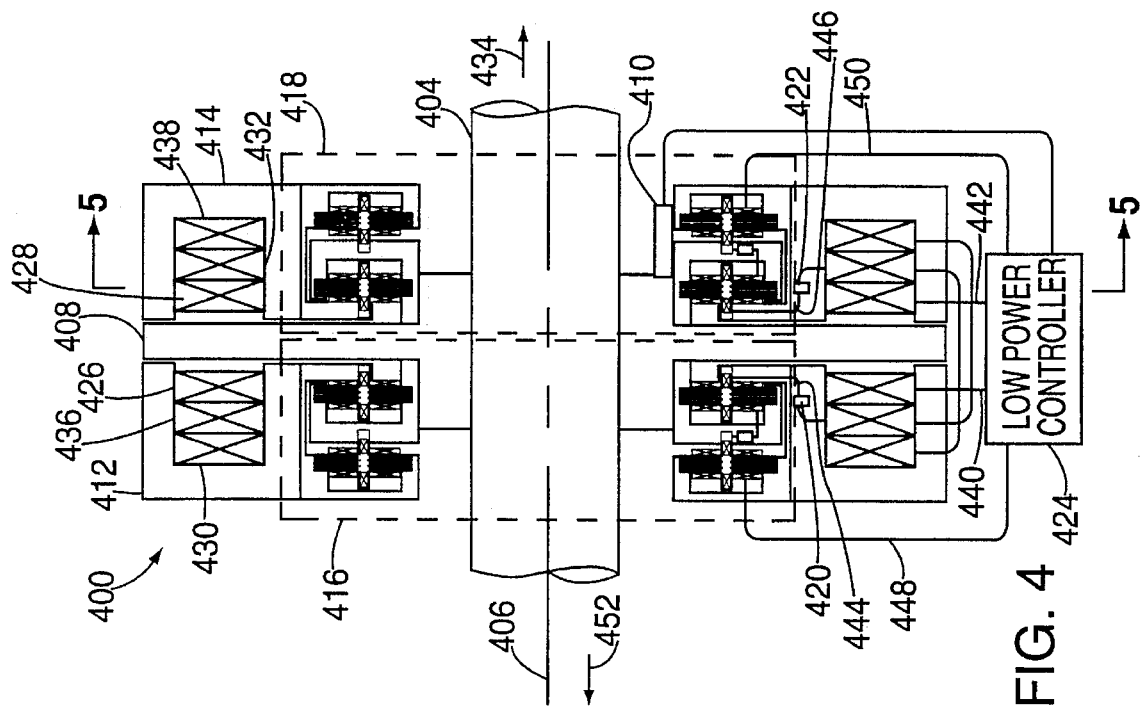
FIG. 4 is a longitudinal cross-sectional view of an alternate preferred embodiment of an axial active magnetic bearing, in accordance with the principles of the present invention.

An alternate preferred embodiment of the axial magnetic bearing of the present invention is shown in FIG. 4, for which axial magnetic bearing 400 is now described. This embodiment may be more practical to use in circumstances where the magnetic bearing may be subject to significant electrical noise (because the SCRs of bearing 200 may suffer performance degradation in environments having high levels of electrical noise). Magnetic Bearing 400 is similar to magnetic bearing 200 of FIG. 2, however bearing 400 does not require SCRs to apply control current to the electromagnets. Instead, as described below, bearing 400 includes a second brushless generator and a simple full-wave bridge rectifier circuit (the physical arrangement of the brushless generators is also different with respect to the electromagnets, as is apparent from the figures).

Magnetic bearing 400 includes a stationary housing (not shown, but substantially similar to housing 202 of FIG. 2), shaft 404 (which rotates about axis 406), disk 408, position sensor 410, electromagnets 412 and 414, brushless generators 416 and 418, full-wave bridge rectifiers 420 and 422 and low power controller 424. Electromagnets 412 and 414 also include bias windings 426 and 428, positive control windings 430 and 432 (where positive refers to movement in the direction shown by reference numeral 434) and negative control windings 436 and 438, respectively.

Figure 5:
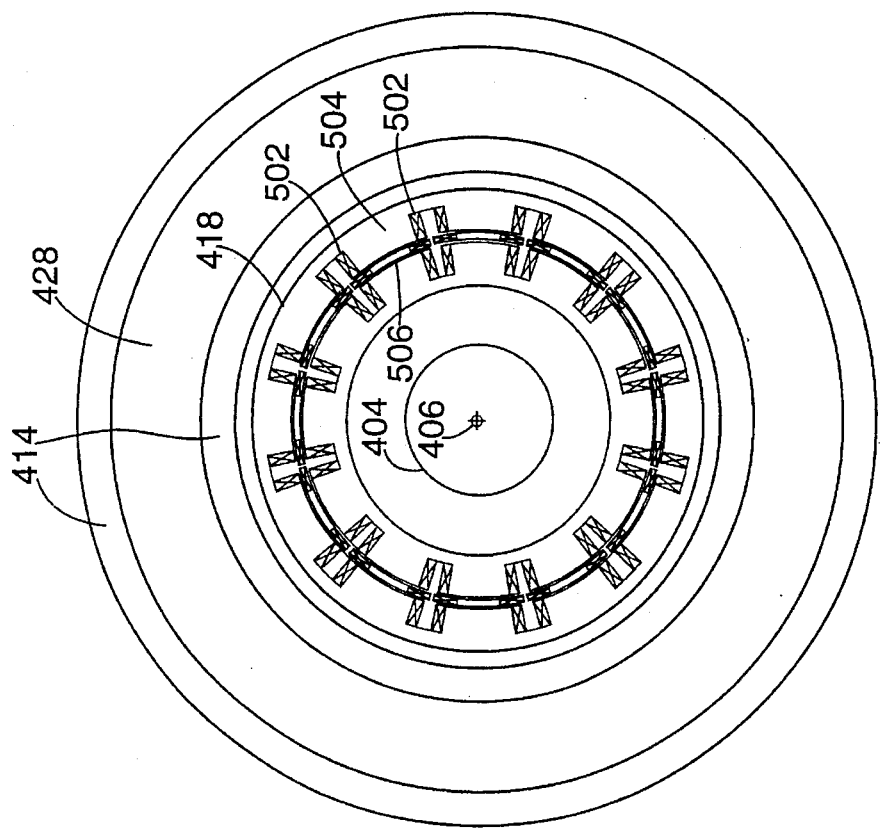
FIG. 5 is a radial cross-sectional view of the axial magnetic bearing of FIG. 4, taken from line 4—4 of FIG. 4.

Brushless generators 416 and 418 are substantially identical to, and perform the same functions as, brushless generator 216 of FIG. 2 and are therefore not described in further detail with respect to FIG. 4. FIG. 5 shows a radial cross-sectional view of magnetic bearing 400 taken along line 5—5 of FIG. 4. More specifically, FIG. 5 shows the manner in which windings 502 are wound around core 504 and that the plurality of air-core coils 506 are located at equidistant positions circumferentially about axis 406. Windings 502, core 504 and air-core coils 506 are substantially identical to, and perform the same functions as, windings 238, core 236 and air-core coils 246 of FIG. 2. FIG. 5 also shows the configuration of electromagnets 414 and windings 428.

The operation of magnetic bearing 400 will now be described. Controller 424 constantly applies a DC current to bias windings 426 and 428 through lines 440 and 442 to maintain a constant bias field in the air-gaps of electromagnets 412 and 414. It should be noted that the constant fields may just as easily be produced by properly placing permanent magnets (not shown) about electromagnets 412 and 414 without departing from the spirit of the invention.

Unlike SCRs 218 of magnetic bearing 200 (which provided current to the electromagnets in either polarity), rectifiers 420 and 422 only provide current in one polarity. To compensate for this, electromagnets 412 and 414 each have an additional control winding (one positive and one negative, as described above) and a second brushless generator is provided.

The brushless generators 416 and 418 are wired such that when generator 416 is turned on by low power controller 424, generator 416 supplies current to the electromagnets 412 and 414 causing the field of electromagnet 412 to strengthen and the field of electromagnet 414 to weaken. To the contrary, when generator 418 is turned on by controller 424, the field of electromagnet 414 is strengthened and the field of electromagnet 412 is weakened.

Position sensor 410 measures the axial distance between disk 408 and the housing. If disk 408 is axially centered, controller 420 takes no action. However, if sensor 410 determines that disk 408 is displaced in either axial direction, controller 424 sends a signal through the appropriate input line to the appropriate brushless generator. As described above, this signal is amplified by a factor of about 10,000 and is directed to the rectifiers 420 and 422 through lines 444 and 446.

If sensor 410 determines that shaft 404 has moved in one axial direction, one of generators 416 and 418 is turned on by controller 424 (through lines 448 and 450, respectively) causing the amplified current to flow from the selected brushless generator to electromagnets 412 and 414. In the presence of the bias currents, a generator current causes an increase in electromagnetic force of the electromagnet opposite the offset (i.e., an offset in direction 434 generates a current from brushless generator 416 causing an increase in force in electromagnet 412 and a corresponding decrease in force in electromagnet 414, while an offset in direction 452 has the opposite effect) which pulls disk 408 back toward its center position.

Figure 6:
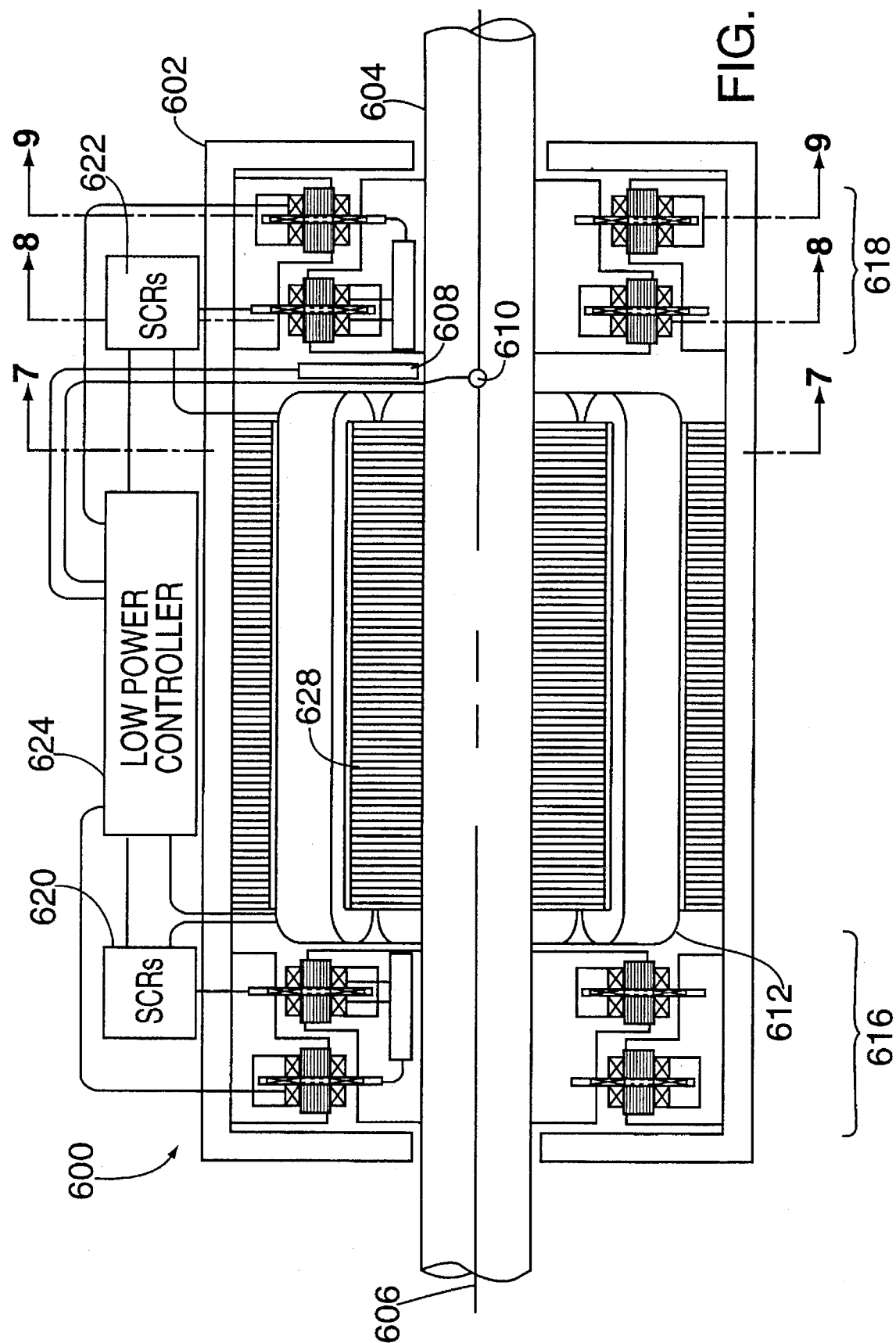
FIG. 6 is a longitudinal cross-sectional view of a preferred embodiment of a radial active magnetic bearing, in accordance with the principles of the present invention.

Another preferred embodiment of the present invention is shown in FIG. 6, for which a radial active magnetic bearing 600 is now described. Magnetic bearing 600 may be constructed in accordance with many of the principles discussed above regarding magnetic bearing 200 (of FIG. 2). One difference between magnetic bearings 200 and 600 is that magnetic bearing 200 provides axial position realignment, while magnetic bearing 600 provides radially displacement corrections (which requires two axis monitoring versus the one axis monitoring for magnetic bearing 200 of FIG. 2).

Additionally, brushless generator 216 generated axially directed fields while the brushless generators of FIG. 6 generate radially directed fields (therefore, as described above, the radial length of the core of the electromagnets must be greater then the axial air-gap between the pairs of electromagnets). However, it should be noted that the configuration of the brushless generator is not critical to the operation of the magnetic bearings of the present invention. Thus, a brushless generator generating radially directed fields would work just as well in magnetic bearing 200 as the brushless generator shown in FIG. 2. In other respects, the two magnetic bearings are essentially the same.

Magnetic bearing 600 includes housing 602, shaft 604 (which rotates about axis 606), Y-axis position sensor 608, X-axis position sensor 610, electromagnet 612, X-axis brushless generator 616, Y-axis brushless generator 618, X-axis SCRs 620, Y-axis SCRs 622 and low power controller 624. Brushless generators 616 and 618 operate in substantially the same manner as brushless generator 216 of FIG. 2, where the input signal from low power controller 220 is amplified and output to SCRs 218 and thus, are not described in detail here.

Figure 9:
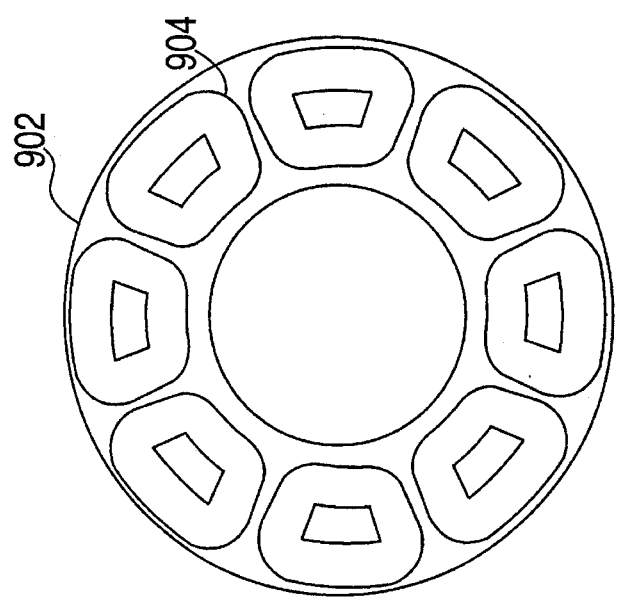
FIG. 9 is a radial cross-sectional view of the radial magnetic bearing of FIG. 6, taken from line 9—9 of FIG. 6.
Figure 8:
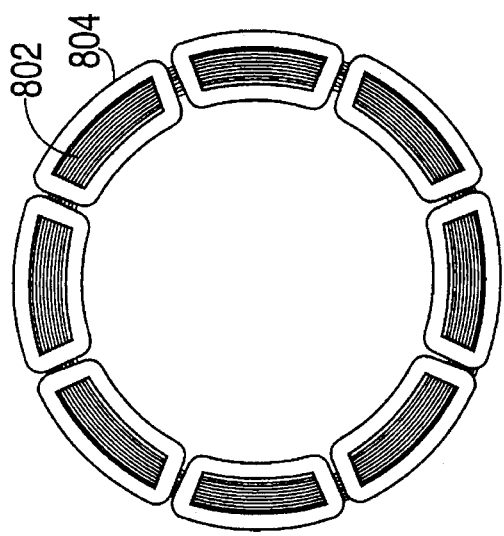
FIG. 8 is a radial cross-sectional view of the radial magnetic bearing of FIG. 6, taken from line 8—8 of FIG. 6.
Figure 7:
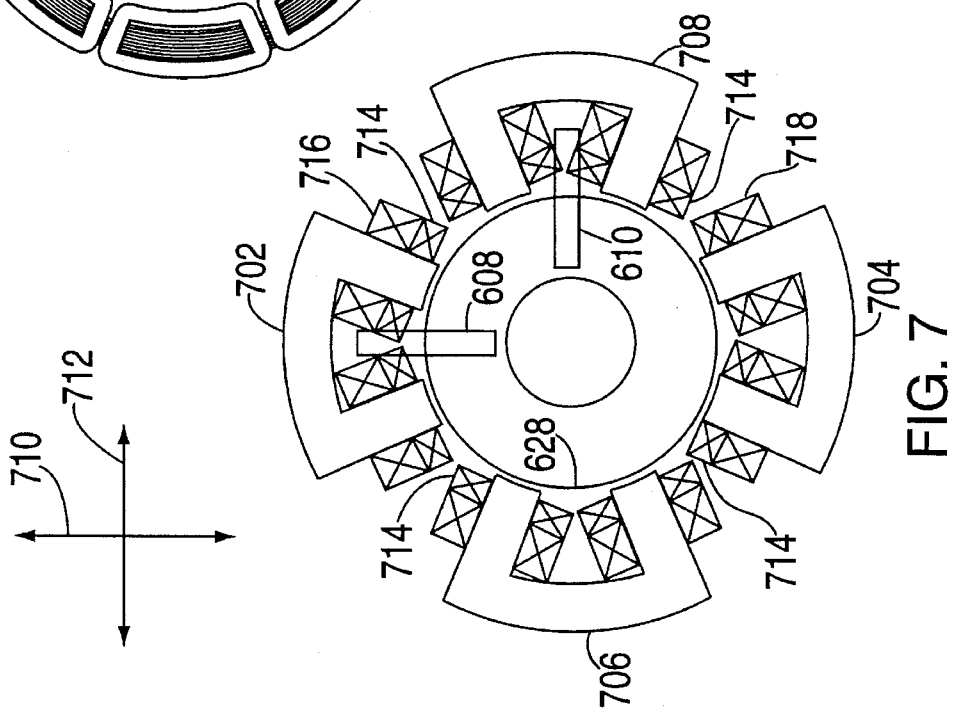
FIG. 7 is a radial cross-sectional view of the radial magnetic bearing of FIG. 6, taken from line 7—7 of FIG. 6.

The only difference between generator 216 and generators 616 and 618 is the orientation of the field generation components and the air-core coils. For example, the air-core coils of generators 616 and 618 are installed within a disk assembly (see disk 902 and air-core coils 904 of FIG. 9) rather than a tube as described with respect to FIG. 2. Thus, while the air-coil cores of FIG. 2 appear to be parallel to the axis of rotation, the air-core coils of FIG. 6 instead appear to extend radially from the axis of rotation. This is necessary because the field generation components of generator 216 produce axially directed fields, while the generators of FIG. 6 produce radially directed fields (see cores 802 and windings 804 of FIG. 8). All other aspects of the operation of generators 616 and 618 are the same as that described above for generator 216.

The operation of magnetic bearing 600 will now be described with respect to FIGS. 6–9. As with magnetic bearing 200 of FIG. 2, each of the electromagnets 702, 704, 706 and 708 (see FIG. 7) is provided a constant DC current to bias windings 714 (see FIG. 7) which generates a constant bias field about each electromagnet. Due to the nature of controlling radial displacement, rather than axial displacement, magnetic bearing 600 must monitor and respond to variations in two different axes (Y-axis 710 and X-axis 712 (see FIG. 7), which is the axis orthogonal to axes 606 and 710) instead of one (axis 606). Thus, magnetic bearing 600 includes essentially two instances of the components shown in FIG. 2, one for each axis. Additionally, it is preferable to mount a plurality of iron laminates 628 to rotating shaft 604 (which is smooth) to reduce the effects of eddy-currents.

As position sensors 608 and 610 detect variations in position, low power controller 624 responds with the appropriate input signals to brushless generators 616 and 618 (and the proper control signals to SCRs 620 and 622). For example, if position sensor 608 detects a positive variation in axis 710, controller 624 sends an input signal to generator 618 which provides an output signal to SCRS 622. SCRS 622 supplies currents to control windings 716 and 718 of electromagnets 702 and 704, respectively. The currents, in the presence of the bias currents, reduce the strength of the field in electromagnet 702 and increase the strength of the field in electromagnet 704 such that laminated shaft 604/628 is pulled in a negative direction along Y-axis 710.

A similar process occurs for displacement variations along X-axis 712 with respect to SCRs 620, generator 616 and electromagnets 706 and 708. Persons skilled in the art will appreciate that off-axis displacement variations are compensated for by generating appropriate correction currents in both axes 710 and 712 simultaneously, such that laminated shaft 604/628 is still re-centered.

It will be understood that the foregoing is only illustrative of the principles of the invention, and that various modifications can be made by those skilled in the art without departing from the scope and spirit of the invention. For example, the SCRs shown in FIG. 6 could also be replaced with full-wave bridge rectifiers if four brushless generators were used instead of the configuration which has been described. Alternatively, if even greater power requirements existed, the two-stage brushless generators could be replaced by four-stage brushless generators (i.e., two two-stage brushless generators in series), which would provide an output signal to the electromagnets approximately 100,000,000 times greater than the power of the input signal.

I claim:

1. An active magnetic bearing comprising:
    a member having a shaft which may be rotated about a first axis;
    at least one electromagnet having a control winding adapted for receiving control currents, said electromagnet generating fields upon being energized, said fields applying electromagnetic forces to said member;
    at least one position sensor for measuring displacement of said shaft along at least a second axis;
    a low power controller for providing input signals in response to the displacement measured by said position sensor;
    at least one brushless generator adapted for receiving said input signals and for amplifying said input signals into control currents;
    rectifier circuitry for providing said control currents to said electromagnet control windings to vary said fields of said electromagnet to change the electromagnetic forces applied to said member to cause said member to be centered along said second axis.

2. The active magnetic bearing of claim 1, wherein said at least one brushless generator includes a plurality of air-core coils to at least provide said control currents to said rectifier circuitry.

3. The active magnetic bearing of claim 1, wherein said at least one brushless generator is oriented to produce fields in a radial direction with respect to said axis of said shaft.

4. The active magnetic bearing of claim 1, wherein said at least one brushless generator is oriented to produce fields in an axial direction with respect to said axis of said shaft.

5. The active magnetic bearing of claim 1, wherein said electromagnet is constantly energized by a DC bias supply to generate a bias field.

6. The active magnetic bearing of claim 1, wherein said electromagnet is constantly energized by at least one permanent magnet to generate a bias field.

7. The active magnetic bearing of claim 1, wherein said member is a disk mounted to said shaft and said position sensor measures axial displacement of said disk, said first and second axes being the same axis.

8. The active magnetic bearing of claim 7, wherein said controller further provides control signals in response to the displacement measured by said position sensor.

9. The active magnetic bearing of claim 8, wherein said rectifier circuitry, being coupled to said controller, includes first and second silicon controlled rectifiers which provide control currents to said control windings in one of positive and negative polarities based on said control signals.

10. The active magnetic bearing of claim 7, wherein:

said control windings include positive control windings and negative control windings;

said at least one brushless generator includes a positive brushless generator and a negative brushless generator, said positive generator being adapted to provide control currents to said positive control windings and said negative generator being adapted to provide control currents to said negative control windings; and said rectifier circuitry comprises positive and negative full-wave bridge rectifier circuits, said positive rectifier being coupled in series between said positive generator and said positive control windings and said negative rectifier being coupled in series between said negative generator and said negative control windings.

11. The active magnetic bearing of claim 1, wherein:

said at least one position sensor includes first and second position sensors which monitor displacement along second and third axes such that radial displacement of said shaft is monitored;

said at least one brushless generator includes first and second brushless generators which receive input signals corresponding to variations in displacement measured by said first and second sensors, respectively; and said rectifier circuitry includes first and second rectifier circuits for providing said control currents to said control windings of said electromagnet to cause said member to be centered along said second and third axes.

12. An active magnetic bearing comprising:

a member having a shaft which may be rotated about a first axis;

electromagnet field generation means for producing fields in response to being energized, said fields applying electromagnetic forces to said member;

position sensing means for measuring displacement of said shaft along at least a second axis;

a low power controller for providing input signals in response to the displacement measured by said position sensing means;

brushless generator means adapted for amplifying said input signals into control currents;

rectifier means coupled to said brushless generator means for providing said control currents to said electromagnet field generation means to vary said fields to change said electromagnetic forces applied to said member to cause said member to be centered along said second axis.

13. The active magnetic bearing of claim 12, wherein said brushless generator means includes a plurality of air-core coils to at least provide said control currents to said rectifier means.

14. The active magnetic bearing of claim 12, wherein said brushless generator means is oriented to produce fields in a radial direction with respect to said axis of said shaft.

15. The active magnetic bearing of claim 12, wherein said brushless generator means is oriented to produce fields in an axial direction with respect to said axis of said shaft.

16. The active magnetic bearing of claim 12, wherein said electromagnet field generation means is constantly energized by a DC bias supply to generate a bias field.

17. The active magnetic bearing of claim 12, wherein said electromagnet field generation means is constantly energized by at least one permanent magnet to generate a bias field.

18. The active magnetic bearing of claim 12, wherein said member is a disk mounted to said shaft and said position sensing means measures axial displacement of said disk, said first and second axes being the same.

19. The active magnetic bearing of claim 18, wherein said controller means further provides control signals in response to displacement measured by said position sensing means.

20. The active magnetic bearing of claim 19, wherein said rectifier means, being coupled to said controller means, includes first and second silicon controlled rectifiers which provide control currents to said electromagnet field generation means in one of positive and negative polarities based on said control signals.

21. The active magnetic bearing of claim 18, wherein:

said field generation means includes positive control windings and negative control windings;

said brushless generator means includes a positive brushless generator and a negative brushless generator, said positive generator being adapted to provide control currents to said positive control windings and said negative generator being adapted to provide control currents to said negative control windings; and said rectifier means comprises positive and negative full-wave bridge rectifier circuits, said positive rectifier being coupled in series between said positive generator and said positive control windings and said negative rectifier being coupled in series between said negative generator and said negative control windings.

22. The active magnetic bearing of claim 12, wherein:

said position sensing means includes first and second position sensors which monitor displacement along second and third axes such that radial displacement of said shaft is monitored;

said brushless generator means includes first and second brushless generators which receive input signals corresponding to variations in displacement measured by said first and second sensors, respectively; and said rectifier means includes first and second rectifier circuits for providing said control currents to said electromagnet field generation means to cause said member to be centered along said second and third axes.

23. An apparatus for providing five axis magnetic levitation to an object which rotates about a shaft, said apparatus comprising:

first and second radial active magnetic bearings mounted about said shaft such that said radial bearings are sufficiently spaced apart to resist twisting forces, each of said radial bearings including a radial electromagnet assembly, first and second position sensors, first rectification circuitry and at least first and second brushless generators which provide control currents through said first rectification circuitry to said radial electromagnet assembly in response to displacement variations measured by said first and second position sensors; and an axial active magnetic bearing mounted about said shaft, said axial bearing including an axial electromagnet assembly, a third position sensor, second rectification circuitry and at least a third brushless generator which provides control currents through said second rectification circuitry to said axial electromagnet assembly in response to displacement variations measured by said third position sensor, the responses of all of said electromagnet assemblies acting to magnetically levitate said rotating object.

24. The apparatus of claim 23, wherein each of said brushless generators includes air-core coils which at least provide said control currents to said first and second rectification circuitry.

25. A method for providing displacement offset corrections to a magnetic bearing mounted about a rotating member, said method comprising the steps of:

measuring displacement of said rotating member along at least one axis;

producing input signals in response to said measured displacement;

amplifying said input signals utilizing a brushless generator to produce control currents;

rectifying said control currents;

energizing an electromagnet assembly mounted with respect to said rotating member to produce fields which generate electromagnetic forces upon said member;

providing said control currents to said electromagnet assembly to cause said electromagnet assembly to vary said electromagnetic forces to move said rotating member such that said measured displacement is substantially reduced.

26. The method of claim 25, wherein said brushless generator includes air-core coils which at least produce said control currents that are rectified by said step of rectification.

* * * * *